Figures 1, 2:
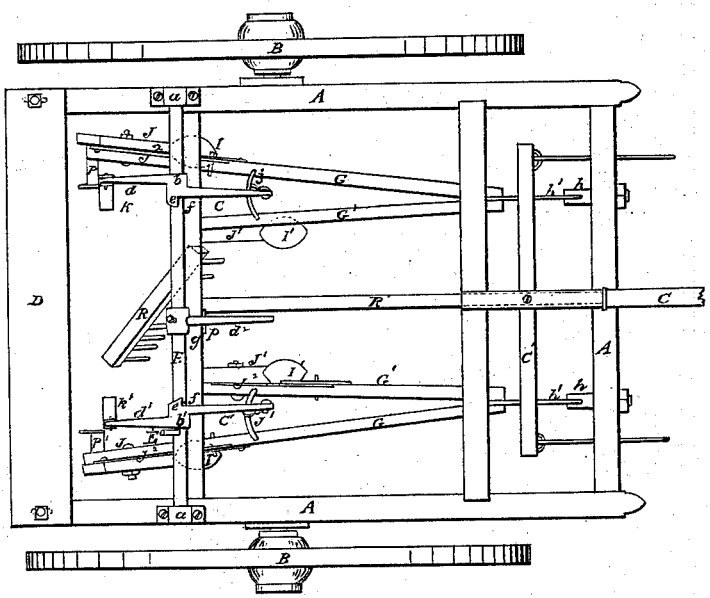

2 Sheets—Sheet 1.

J. HOLLINGSWORTH.
Wheel-Cultivator.

No. 47,641. Patented May 9, 1865.

Witnesses:
R. T. Campbell
E. Schafer

Inventor:
Jas Hollingsworth
by his atty
Mason, Fenwick & Lawrence

2 Sheets—Sheet 2.
J. HOLLINGSWORTH.
Wheel-Cultivator.
No 47,641. Patented May 9, 1865.
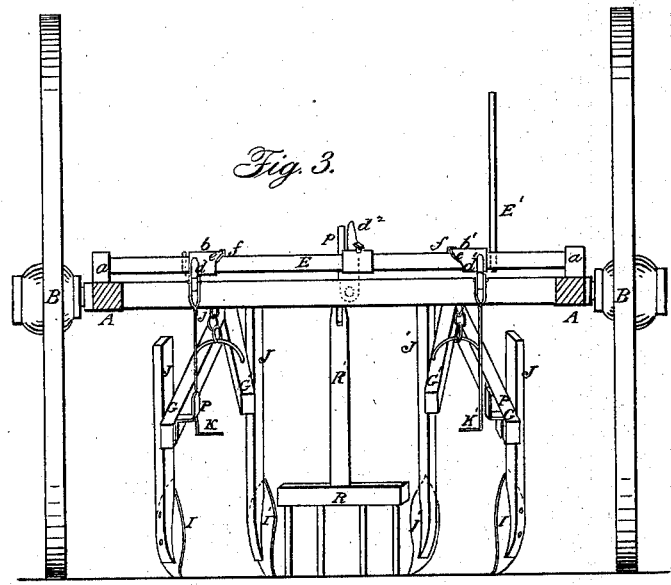
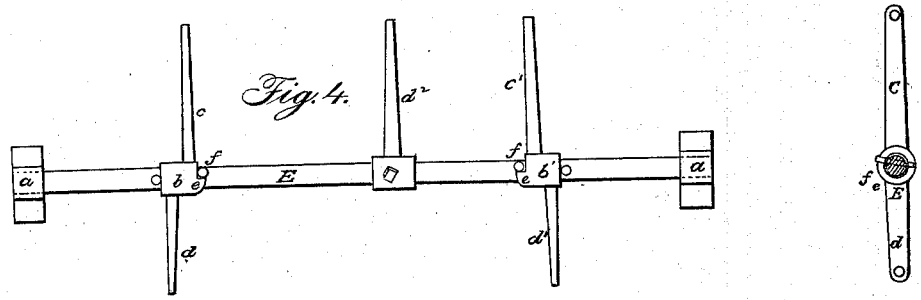
Witnesses:
R. T. Campbell
El Schafer
Inventor:
Jas. Hollingsworth
by his atty
Mason, Fenwick & Lawrence

UNITED STATES PATENT OFFICE.

JAMES HOLLINGSWORTH, OF CHICAGO, ILLINOIS.

IMPROVEMENT IN CULTIVATORS.

Specification forming part of Letters Patent No. 47,641, dated May 9, 1865.

*To all whom it may concern:*

Be it known that I, JAMES HOLLINGSWORTH, of Chicago, Cook county, State of Illinois, have invented a new and Improved Cultivator; and I do hereby declare that the following is a full, clear, and exact description thereof, reference being had to the accompanying drawings, making a part of this specification, in which—

Figure 1, Sheet 1, is a plan view of my improved cultivator. Fig. 2, Sheet 1, is a vertical section taken longitudinally through the same. Fig. 3, Sheet 2, is a vertical transverse section taken through the rear part of the machine. Fig. 4, Sheet 2, shows the shaft and the arms which support the cultivators and treadles. Fig. 5, Sheet 2, is a transverse section through said shaft.

Similar letters of reference indicate corresponding parts in the several figures.

This invention relates particularly to that class of implements which are intended for the cultivation of corn and other crops that are planted in hills and require weeding, hoeing, and thinning out during the early stages of the plants.

The main object of my invention is to facilitate the work of guiding the shovels along or between the rows of plants during the forward movement of the machine by the employment of spring shovel-bars, which are secured at their forward ends to the frame of the machine in such manner that when they are thrust to one side from any cause their will return to their proper position by their own elasticity, as will be hereinafter described.

Another object of my invention is to provide an adjustable seat for the driver and to combine such a seat with adjustable treadles for enabling the attendant to adjust these parts to suit his own convenience and to elevate or depress either one or both shovel-beams at pleasure by a movement of his feet, as will be hereinafter described.

Another object of my invention is to suspend the shovel-carrying beams by means of levers, which articulate upon a rock-shaft in such manner that the attendant, while riding upon the machine and seated thereon, can elevate either or both sets of shovels by means of his feet alone, or can employ his feet and also his hands for elevating the two sets of shovels at pleasure, as will be hereinafter described.

Another object of my invention is to combine a rake with a cultivator in such manner that such rake serves as a shield or fender for protecting the young plants from being covered up with earth by the shovels, and also as a means for leveling the earth which is thrown about the plants, as will be hereinafter described.

To enable others skilled in the art to understand my invention, I will describe its construction and operation.

In the accompanying drawings, A represents a rectangular frame, which is composed of longitudinal beams secured and braced by transverse beams, as clearly shown in Fig. 1; and B B are two transporting-wheels, which connect with the frame A by means of short axles that project from the longitudinal beams.

C is the draft-pole, which is secured rigidly on top of the two forward transverse beams of frame A; and C' is the single-tree to which the horses are hitched. This latter beam is pivoted beneath that portion of the draft-pole C which extends across the transverse beams.

D is the driver's seat, which is secured on top of the longitudinal beams of frame A and extends transversely across the rear ends of these beams, as shown in Figs. 1 and 2. This seat D is secured to said beams by means of vertical bolts, which pass through oblong holes, so that by loosening the bolts the seat can be set farther forward or backward, as circumstances may require, and then secured again in the desired position.

In front of the driver's seat D is a horizontal rock-shaft, E, which extends transversely across the frame A, and has its end bearings in boxes $a\ a$, which are secured on top of the longitudinal beams. Upon this rock-shaft E are placed two tubular bearings, $b\ b'$, which have arms $c\ c'\ d\ d'$ formed on them and extending forward and in rear of the shaft E, as shown in Figs. 1 and 2. The tubes $b\ b'$ are constructed with teeth $e\ e'$, projecting from one end of each, which serve, in conjunction with the stop-pins $f f'$ on the shaft E, as clutches for preventing the forward arms, $c\ c'$, from being drawn down too far by the load which is suspended beneath them.

At an intermediate point between the two tubular bearings $b\ b'$ an arm, $d^2$, is secured rigidly to the shaft E, and extends forward thereof, so as to rest upon the transverse beam $g$ of frame A and prevent the shaft E, with its tubular bearings, from turning too far forward. A lever or handle, E', projects from the shaft E, and is used for rocking this shaft and elevating both sets of shovels from the ground, as will be presently described.

To the inside edge of the foremost transverse beam of the frame A, I secure at proper points two slotted bearings, $h\ h$, and in the vertical slots thereof I insert steel plates $h'\ h'$, which are pivoted by means of horizontal transverse pins $i\ i$ to the bearings $h\ h$, so as to allow their rear ends to rise or fall. These spring-plates $h'\ h'$ extend back a suitable distance and have secured to their rear extremities the wooden shovel-beams G G G' G', which are spread apart at their rear ends so as to carry the shovels I I I' I' at the proper distances apart. The inside beams, G' G', are somewhat shorter than the outside beams, G G, and both sets of beams are suspended by means of chains $j\ j'$ from the arms $c\ c'$ of the rock-shaft E, so that when these arms are raised the beams will also rise, and vice versa.

The shovels I I', which may be made in the form represented in the drawings, are secured in a suitable manner to standards J J', which are pivoted to their respective beams and secured thereto in the proper position by means of diagonal braces $J^2$, which latter may be attached to the beams by means of wooden pins which will break should the shovels strike an obstruction in their path that would be liable to derange the machine.

To the rear arms, $d\ d'$, of the tubular bearings $b\ b'$, are pivoted adjustable stirrups K K', which hang down therefrom and serve as treadles, by means of which the attendant, while sitting upon the seat D, can elevate either one or both sets of shovels with his feet.

On the inside surfaces of the longest beams, G G, and near the rear ends thereof, are affixed stirrups P P', which are adapted for receiving the feet of the attendant while he is sitting upon seat D, and enabling him to move the shovel-beams in a lateral direction, either to the right or to the left, for the purpose of causing the shovels to follow the rows of plants.

By means of the stirrups or treadles P P the attendant can press upon the shovels, if desirable, and exercise complete control over their movements with his feet, while his hands are at liberty. When it is desired the attendant can elevate both sets of shovels free from the ground by drawing the lever E' toward him, after which the pivoted plate $p$ can be brought under the fixed arm and the shovels retained in an elevated position.

In conjunction with my cultivator I employ a rake, R, which is secured on the rear end of the rake-handle, R', that is secured by means of a pivot-joint to the foremost transverse beam of the frame A. The rake is arranged obliquely upon its handle, and it is located just in rear of the shovels I' I', as shown in Fig. 1. The teeth of said rake are arranged at such distances apart as will allow them to pass safely on either side of the plants and level the loose earth which is thrown up by the shovels. If desirable, provision may be made for elevating the rake at suitable times for clearing it of gathered weeds and trash.

The spring shovel-bars which I have above described are composed partly of metal and partly of wood; but I do not confine myself to such a combination, as these bars may be made of metal entirely or of any wood which will afford the desired elasticity. I prefer to make such bars as I have herein described for the reason that elasticity is obtained at the most desirable point, and stiffness is secured where it is most required. If made wholly of metal or of wood, the bars may be made somewhat thinner at and near their pivoted ends, so that they will spring at these points. By thus constructing the bars for the shovels they will admit of the required lateral motion being given to them, and do not require joints or slides for this purpose; and by the use of spring shovel-bars I avoid one-half the labor required to move the shovels laterally through the earth on their return to the corn-row and afford the attendant such perfect control over the shovels that in running the machine through very irregular rows none of the plants need be destroyed.

Having thus described my invention, what I claim as new, and desire to secure by Letters Patent, is—

1. The use of spring shovel-beams which will admit of a lateral swinging movement of the shovels, substantially as described.

2. Constructing cultivator-shovel beams of wood and metal, substantially as described.

3. The rock-shaft E, provided with loose arms $c\ d$ and lever E, for enabling the attendant to elevate the shovel-beams singly or together at pleasure, substantially as described.

JAMES HOLLINGSWORTH.

Witnesses:
CHAS. H. BARNUM,
PHILIPP ALBRECHT.